United States Patent
Konttori et al.

(10) Patent No.: US 11,029,385 B2
(45) Date of Patent: Jun. 8, 2021

(54) TRACKING SYSTEM FOR HEAD-MOUNTED DISPLAY APPARATUS AND METHOD OF TRACKING

(71) Applicant: Varjo Technologies Oy, Helsinki (FI)

(72) Inventors: Urho Konttori, Helsinki (FI); Klaus Melakari, Oulu (FI)

(73) Assignee: Varjo Technologies Oy, Helsinki (FI)

(*) Notice: Subject to any disclaimer, the term of this patent is extended or adjusted under 35 U.S.C. 154(b) by 318 days.

(21) Appl. No.: 16/376,085

(22) Filed: Apr. 5, 2019

(65) Prior Publication Data

US 2020/0319290 A1  Oct. 8, 2020

(51) Int. Cl.
*G01S 5/02* (2010.01)
*G01S 5/18* (2006.01)
*G01S 5/16* (2006.01)

(52) U.S. Cl.
CPC .......... *G01S 5/0294* (2013.01); *G01S 5/0221* (2013.01); *G01S 5/0284* (2013.01); *G01S 5/16* (2013.01); *G01S 5/18* (2013.01)

(58) Field of Classification Search
CPC ........ G01S 5/0294; G01S 5/0284; G01S 5/18; G01S 5/16; G01S 5/0221; G01S 5/0247; G01S 5/02; G06F 3/017; G06F 3/011; G06F 3/012; G06F 3/038; G06F 1/163; G02B 2027/014; G02B 27/017; G02B 27/0093; G16H 40/63; H04N 13/344; G08C 17/02
USPC ........................................................ 342/451
See application file for complete search history.

(56) References Cited

U.S. PATENT DOCUMENTS

2016/0238692 A1* 8/2016 Hill ........................... G06F 3/14

* cited by examiner

*Primary Examiner* — Shaima Q Aminzay
(74) *Attorney, Agent, or Firm* — Ziegler IP Law Group, LLC (57) ABSTRACT

A tracking system for use in head-mounted display apparatus includes at least one emitter that emits signals; a first receiver and a second receiver that sense the emitted signals and generate sensor data, the first receiver and the second receiver being arranged on a first portion and a second portion, respectively, wherein the first portion faces a user when the head-mounted display apparatus is worn by the user, and the second portion is a part of a user-interaction controller of a head-mounted display; and a processor configured to process the generated sensor data to determine relative positions and orientations of first receiver and second receiver with respect to the emitter, and to determine a relative position and orientation of the second receiver with respect to the first receiver.

24 Claims, 4 Drawing Sheets

TRACKING SYSTEM FOR HEAD-MOUNTED DISPLAY APPARATUS AND METHOD OF TRACKING

TECHNICAL FIELD

The present disclosure relates generally to tracking systems; and more specifically, to tracking systems for use in head-mounted display apparatuses comprising emitters, receivers and processors. Furthermore, the present disclosure also relates to methods of tracking.

BACKGROUND

Nowadays, several specialized devices (for example, such as Virtual Reality devices, Augmented Reality (AR) devices, Mixed Reality (MR) devices, and the like) are being used by users to experience and interact with simulated environments (for example, such as AR, MR and the like). Such simulated environments use contemporary techniques (for example, such as stereoscopy) to provide the user with a feeling of immersion within the simulated environments.

Generally, such specialized devices include interaction controllers (for example, such as remote controllers, joysticks, and the like) that are used by the users to interact with the simulated environment. While using the specialized devices, the users often move said interaction controllers within a physical environment whereat the users are present. In order to properly emulate said physical-world movement of the interaction controllers in the simulated environment, the specialized devices require knowledge of a position and an orientation of the interaction controllers in the physical environment.

Presently, the specialized devices employ tracking equipment to track the position and the orientation of the interaction controllers within the physical environment. Examples of such tracking equipment include external cameras that illuminate the physical environment with a light pattern, laser beacons and diode firing-based equipment employing triangulation, electromagnetic field generators, and the like. As an example, the electromagnetic field generators include a transmitter that emits electromagnetic signals, and receivers that receive the emitted electromagnetic signals. Relative positions and orientations of the transmitter and the receivers with respect to each other are determined using the received signals.

However, such tracking equipment have several limitations associated therewith. In an example, the transmitter used in the electromagnetic field generators is large in size, power consuming and is bulky. As a result, arranging the transmitter within the specialized devices without adversely impacting usability of the specialized devices is difficult. In another example, when multiple interaction controllers are used in a same physical environment, said interaction controllers interfere with each other. This considerably reduces accuracy and efficiency of the tracking equipment.

Therefore, in light of the foregoing discussion, there exists a need to overcome the aforementioned drawbacks associated with conventional tracking equipment for specialized devices.

SUMMARY

The present disclosure seeks to provide a tracking system for use in a head-mounted display apparatus. The present disclosure also seeks to provide a method of tracking. The present disclosure seeks to provide a solution to the existing problems of sub-optimal design and inaccuracies among existing tracking equipment for specialized devices. An aim of the present disclosure is to provide a solution that overcomes at least partially the problems encountered in prior art, and provides a well-designed, simple, accurate and user-friendly tracking system for the head-mounted display apparatus.

In one aspect, an embodiment of the present disclosure provides a tracking system for use in a head-mounted display apparatus, the tracking system comprising:
  at least one emitter that, in operation, emits signals;
  a first receiver and a second receiver that, in operation, sense the emitted signals and generate sensor data, the first receiver and the second receiver being arranged on a first portion and a second portion of the head-mounted display apparatus, respectively, wherein the first portion faces a user when the head-mounted display apparatus is worn by the user, and the second portion is a part of a user-interaction controller of the head-mounted display apparatus; and
  a processor configured to process the generated sensor data to determine relative positions and orientations of the first receiver and the second receiver with respect to the at least one emitter, and to determine, based on the determined relative positions and orientations, a relative position and orientation of the second receiver with respect to the first receiver.

In another aspect, an embodiment of the present disclosure provides a method of tracking, the method comprising:
  emitting signals, via at least one emitter;
  sensing, via a first receiver and a second receiver, the emitted signals and generating sensor data, the first receiver and the second receiver being arranged on a first portion and a second portion of a head-mounted display apparatus, respectively, wherein the first portion faces a user when the head-mounted display apparatus is worn by the user, and the second portion is a part of a user-interaction controller of the head-mounted display apparatus;
  processing the generated sensor data to determine relative positions and orientations of the first receiver and the second receiver with respect to the at least one emitter; and
  determining, based on the determined relative positions and orientations, a relative position and orientation of the second receiver with respect to the first receiver.

Embodiments of the present disclosure substantially eliminate or at least partially address the aforementioned problems in the prior art, and enable accurate tracking of a pose of the head-mounted display apparatus, via the tracking system.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a tracking system for use in a head-mounted display apparatus, the tracking system comprising:
at least one emitter that, in operation, emits signals;
a first receiver and a second receiver that, in operation, sense the emitted signals and generate sensor data, the first receiver and the second receiver being arranged on a first portion and a second portion of the head-mounted display apparatus, respectively, wherein the first portion faces a user when the head-mounted display apparatus is worn by the user, and the second portion is a part of
a user-interaction controller of the head-mounted display apparatus; and a processor configured to process the generated sensor data to determine relative positions and orientations of the first receiver and the second receiver with respect to the at least one emitter, and to determine, based on the determined relative positions and orientations, a relative position and orientation of the second receiver with respect to the first receiver.

In another aspect, an embodiment of the present disclosure provides a method of tracking, the method comprising:
emitting signals, via at least one emitter;
sensing, via a first receiver and a second receiver, the emitted signals and generating sensor data, the first receiver and the second receiver being arranged on a first portion and a second portion of a head-mounted display apparatus, respectively, wherein the first portion faces a user when the head-mounted display apparatus is worn by the user, and the second portion is a part of a user-interaction controller of the head-mounted display apparatus;
processing the generated sensor data to determine relative positions and orientations of the first receiver and the second receiver with respect to the at least one emitter; and
determining, based on the determined relative positions and orientations, a relative position and orientation of the second receiver with respect to the first receiver.

The present disclosure provides the aforementioned tracking system and the aforementioned method of tracking. In the tracking system, an arrangement of the at least one emitter and the receivers is optimally selected to facilitate accurate tracking of the head-mounted display apparatus without adversely impacting user-friendliness of the head-mounted display apparatus. In other words, components of said tracking system can be compactly arranged on the head-mounted display apparatus, thereby enabling easy movement of the head-mounted display apparatus by the user. The aforesaid method of tracking is simple, fast, and yields reliable results.

Throughout the present disclosure, the term "head-mounted display apparatus" refers to specialized equipment that is configured to present a simulated environment to a user when said equipment in operation is worn by the user on his/her head. In such an instance, the head-mounted display apparatus acts as a device (for example, such as a Virtual Reality (VR) headset, a pair of VR glasses, an Augmented Reality (AR) headset, a pair of AR glasses, a Mixed Reality (MR) headset, a pair of MR glasses, and the like) that is operable to present a visual scene of the simulated environment to the user. In an example, the visual scene may be a virtual reality movie. In another example, the visual scene may be an educational augmented reality tutorial. In yet another example, the visual scene may be a mixed reality game.

Throughout the present disclosure, the term "tracking system" refers to specialized equipment for detecting and following a pose of the head-mounted display apparatus. Herein, the term "pose" encompasses both position and orientation.

The tracking system is a true six Degrees of Freedom (6DoF) tracking system. Notably, the tracking system allows for tracking the position and the orientation of the head-mounted display apparatus in three dimensions. In particular, the tracking system is configured to track translational movements (namely, surge, heave and sway movements) and rotational movements (namely, roll, pitch and yaw movements) of the head-mounted display apparatus within a three-dimensional space of a real-world environment. It will be appreciated that use of said tracking system in the head-mounted display apparatus allows for providing a truly immersive simulated reality experience to the user. Beneficially, the visual scene to be presented to the user can be adjusted according to a current pose of the head-mounted display apparatus for providing a realistic perception of the simulated environment to the user.

Throughout the present disclosure, the term "emitter" refers to specialized equipment that, in operation, emits signals. The emitted signals disperse within the real-world environment, and can be sensed by receiver(s) arranged within said real-world environment. The at least one emitter can be understood to be at least one "signal source" or at least one "signal transmitter".

As an example, a given emitter may be an orthogonal coil emitter comprising three coils, said coils being arranged orthogonally to one another. When such an emitter would be driven, for example, by an alternating electric current (continuous, pulsed, or a combination of both), the three coils would emit orthogonal signals that spread across the three-dimensional space of the real-world environment. Moreover, signals employed to drive the three coils may have different attributes. For example, three signals employed to drive the three coils may be time-separable or frequency-separable.

Optionally, the at least one emitter is an isotropic emitter. In other words, the at least one emitter emits a same intensity of the signals in all directions.

Optionally, the at least one emitter emits signals within a predefined region of the real-world environment. As an example, the at least one emitter may emit signals within a 100 cubic meters region of the real-world environment.

In an embodiment, the emitted signals are electromagnetic signals. Such electromagnetic signals can be understood to be electromagnetic waves of an electromagnetic field. The electromagnetic field is a combination of an electric field and a magnetic field. Since an intensity of the electromagnetic field varies spatially within the real-world environment, such electromagnetic signals can be employed to accurately track the pose of the head-mounted display apparatus within the real-world environment. An intensity of the electromagnetic field sensed by a given receiver reduces with increase in a distance between the given receiver and the at least one emitter, thereby allowing for tracking the translational movements of the head-mounted display apparatus. Moreover, a distribution of the intensity of the electromagnetic field along three coordinate axes of the given receiver changes upon rotation of the given receiver, thereby allowing for tracking the rotational movements of the head-mounted display apparatus.

It will be appreciated that the term "electromagnetic signals" encompasses signals having frequencies lying within the electromagnetic spectrum. Notably, the electromagnetic signals include low-frequency radio signals, high-frequency radio signals, visible signals (light), infrared signals, and the like. Moreover, tracking the pose of the head-mounted display apparatus using the magnetic field of such electromagnetic signals may not require that a line-of-sight be present between the at least one emitter and the first and second receivers. Therefore, such electromagnetic signals can be effectively employed for pose tracking even when there exist physical obstruction(s) between the at least one emitter and the first and second receivers.

As an example, the emitted signals are radio signals. Such radio signals can be understood to be radio waves. Optionally, the radio signals have a frequency lying in the Industrial, Scientific and Medical (ISM) radio bands. In such a case, the tracking system can be used without obtaining a license for providing short range tracking within the real-world environment.

In another embodiment, the emitted signals are acoustic signals. Optionally, the acoustic signals are ultrasound signals. Notably, time taken by the acoustic signals to travel from the at least one emitter to a given receiver is utilized for tracking the pose of the head-mounted display apparatus. In particular, the time taken by the acoustic signals to travel from the at least one emitter to the given receiver increases with an increase in a distance between the at least one emitter and the given receiver. This allows for tracking the translational movements of the head-mounted display apparatus using the acoustic signals. Moreover, when an arrangement of the first and second receivers on the head-mounted display apparatus is known, a time difference between the times taken by the acoustic signals to travel from the at least one emitter to both the first and second receivers allows for tracking the rotational movements of the head-mounted display apparatus.

Throughout the present disclosure, the term "receiver" refers to specialized equipment that, in operation, senses the emitted signals. Upon sensing the emitted signals, a given receiver generates sensor data. Herein, the terms "first receiver" and "second receiver" do not denote any order, quantity, or importance of receivers, but rather are used to distinguish one receiver from another.

It will be appreciated that the first and second receivers are compatible with the at least one emitter. In other words, the first and second receivers are capable of sensing a type of the signals that are emitted by the at least one emitter. Notably, emitter(s) and receivers employed for different tracking technologies (for example, such as radio-frequency based tracking, visible-light based tracking, acoustics-based tracking, and the like) would be different. As an example, when the emitted signals are electromagnetic signals having radio frequency, the emitter and the first and second receivers include compatible radio frequency antennas, and additionally, amplifiers, signal processing circuitry and the like. In such an example, the first and second receivers may be implemented as electromagnetic coils configured to sense the electromagnetic signals having radio frequency. As another example, when the emitted signals are acoustic signals, the first and second receivers are implemented as acoustic receivers.

Furthermore, it will be appreciated that a given emitter-receiver pair is tuned to a same signal frequency or wavelength for implementing the aforesaid sensing operation. Optionally, the tracking system comprises a frequency filter configured to separate frequencies employed for different emitter-receiver pairs from one another. This allows for clearly distinguishing emitted signals corresponding to one emitter-receiver pair from emitted signals corresponding to another emitter-receiver pair, thereby, minimizing tracking errors within the tracking system.

Moreover, it will be appreciated that the first and second receivers are lightweight and small in size. Therefore, a plurality of receivers can beneficially be placed in the first and second portions, and optionally, in other portions of the head-mounted display apparatus to increase an accuracy of the tracking system.

Optionally, the generated sensor data comprises measurements of at least one signal characteristic of the received signals. Optionally, in this regard, the at least one signal characteristic comprises at least one of: a strength, a phase, a wavelength, a frequency, a time-of-flight, an angle of arrival, a polarization, a Doppler spread, a delay spread, a delay signature.

Optionally, the at least one signal characteristic to be measured depends upon the type, and optionally, the wavelength of the emitted signals. For example, when the wavelength of the emitted signals is of the order of few kilometres, the phase of said signals may not be measured. However, when the wavelength of the emitted signals is of the order of few centimetres, the phase of said signals may be measured.

In an example, when the emitted signals are the electromagnetic signals, the generated sensor data may comprise measured strength of induced current and/or induced voltage in the first and second receivers. When a given receiver moves within a spatially variable magnetic field of the electromagnetic signals, a voltage is induced in the given receiver. Said voltage is proportional to a cross product of cross-sectional area of the given receiver and an intensity of the magnetic field sensed by the given receiver. Furthermore, due to the aforesaid induced voltage, a current is induced in the given receiver. The measured strength of the induced current and/or the induced voltage may be utilized by the processor to determine the pose of the given receiver with respect to the at least one emitter.

In another example, when the emitted signals are the electromagnetic signals, the generated sensor data may comprise measured values of strength (namely, power) of received electromagnetic signals at the first and second receivers. Notably, a strength of the emitted electromagnetic signals is greater than the strengths of the received electromagnetic signals since the emitted electromagnetic signals undergo attenuation while propagating through the real-world environment. The measured values of the strengths of received electromagnetic signals at the first and second receivers may be utilized by the processor to determine the pose of the first and second receivers with respect to the emitter. For electromagnetic signals having a frequency within radio spectrum, the aforesaid sensor data is utilized for "radiolocation" of the first and second receivers.

In yet another example, when the emitted signals are the acoustic signals, the generated sensor data comprises time-of-flight measurements of the acoustic signals. Such time-of-flight measurements are values of times taken by the acoustic signals to travel from the at least one emitter to the first and second receivers. Given a time at which the acoustic signals are emitted by the at least one emitter and times at which the acoustic signals are received at the first and second receivers, time durations taken by the acoustic signals to travel from the at least one emitter to the first and second receivers can be determined. Such time durations taken by the acoustic signals to travel from the at least one emitter to the first and second receivers may be utilized by the processor to determine the pose of the first and second receivers with respect to the at least one emitter.

The first receiver and the second receiver are arranged on the first portion and the second portion of the head-mounted display apparatus, respectively. It will be appreciated that the first and second portions of the display apparatus could include additional receiver(s) arranged thereon. As an example, a third receiver and a fourth receiver may also be arranged on the second portion of the display apparatus.

Herein, the terms "first portion" and "second portion" do not denote any order, quantity, or importance of portions of the head-mounted display apparatus, but rather are used to distinguish one portion of the head-mounted display apparatus from another.

The first portion faces the user when the head-mounted display apparatus is worn by the user. In particular, the first portion is in proximity of the user's eyes.

The second portion is a part of the user-interaction controller of the head-mounted display apparatus. Throughout the present disclosure, the term "user-interaction controller" refers to specialized equipment that is used by the user to interact with the simulated environment. Notably, the user interacts with the simulated environment by moving the user-interaction controller within the real-world environment. Examples of the user-interaction controller include, but are not limited to a remote controller, a mouse controller, a joystick controller, and a smartphone controller. Additionally, optionally, the user interacts with the simulated environment by providing an interaction input via the user-interaction controller. Optionally, in this regard, the user provides the interaction input using at least one of: a button of the user-interaction controller, a touch-sensitive display of the user-interaction controller, a microphone of the user-interaction controller. As an example, the user may move the user-interaction controller to point towards an object in the simulated environment, and may press a button on the user-interaction controller to select said object.

According to an embodiment, the user-interaction controller is to be hand-held by the user. According to another embodiment, the user-interaction controller is to be worn by the user. In such a case, the user could wear the user-interaction controller on his/her hand, arm, wrist, leg, neck, and the like.

It will be appreciated that arranging the second receiver, and optionally, the additional receiver(s) on the second portion of the head-mounted display apparatus allows for accurately tracking the pose of the user-interaction controller. Moreover, since a given receiver is lightweight and small in size, arranging the second receiver, and optionally, the additional receiver(s) on the second portion would not make the user-interaction controller bulky. The user interaction controller can therefore be designed to be lightweight and compact.

The processor could be implemented as hardware, software, firmware or a combination of these. The processor is coupled to various components of the tracking system, and is configured to control the operation of the tracking system.

The processor is configured to process the generated sensor data to determine relative positions and orientations of the first receiver and the second receiver with respect to the at least one emitter. Notably, the generated sensor data is processed based upon the type of the emitted signals, wherein the processor employs at least one mathematical formula for said processing. In particular, the at least one mathematical formula to be employed for processing sensor data associated with electromagnetic signals is different from the at least one mathematical formula to be employed for processing sensor data associated with acoustic signals.

As an example, when the emitted signals are electromagnetic signals, the measured strength of induced current and/or induced voltage along three coordinate axes of the first and second receivers can be used to determine intensities of the magnetic field (of the electromagnetic field) along the three coordinate axes of the first and second receivers. The intensities of the magnetic field along the three coordinate axes of the first and second receivers may be used to determine the relative positions and orientations of the first receiver and the second receiver with respect to the at least one emitter.

Moreover, the processor is configured to determine, based on the determined relative positions and orientations, a relative position and orientation of the second receiver with respect to the first receiver. Optionally, in this regard, the processor employs at least one mathematical formula pertaining to three-dimensional coordinate geometry for determining the relative position and orientation of the second receiver with respect to the first receiver.

Optionally, the first portion is in a proximity of an image renderer of the head-mounted display apparatus, a relative position and orientation of the first receiver with respect to the image renderer being known, wherein the processor is configured to determine a relative position and orientation of the user-interaction controller with respect to a field of view that is visible to the user via the image renderer, based on the relative position and orientation of the first receiver with respect to the image renderer and the relative position and orientation of the second receiver with respect to the first receiver.

In an embodiment, the first receiver is directly attached to the image renderer. In another embodiment, the first receiver is attached to the image renderer, via a supporting element.

Optionally, the relative position and orientation of the first receiver with respect to the image renderer is constant, and is set while manufacturing the head-mounted display apparatus. As a result, the relative position and orientation of the first receiver with respect to the image renderer is known. This also simplifies an internal design of the head-mounted display apparatus.

Moreover, optionally, the processor employs at least one mathematical formula pertaining to three-dimensional coordinate geometry for determining the relative position and orientation of the user-interaction controller with respect to the field of view that is visible to the user via the image renderer. In such a case, the at least one mathematical formula is a function of the relative position and orientation of the first receiver with respect to the image renderer, the relative position and orientation of the second receiver with respect to the first receiver, and the relative position and orientation of the first receiver with respect to the image renderer.

It will be appreciated that arranging the first receiver in proximity of the image renderer accommodates for possible alignment issues of the tracking system that may be caused during use of the head-mounted display apparatus. Moreover, magnetic effects of a local magnetic field between the first receiver (that is arranged in proximity to the image renderer) and the at least one emitter can be employed to understand magnetic effects of an magnetic field between the second receiver (that is arranged on the user-interface controller) and the at least one emitter. This allows for improving accuracy and reliability of the tracking system.

It will also be appreciated that determining the relative position and orientation of the user-interaction controller with respect to said field of view potentially facilitates a simulated-environment portrayal of the user-interaction controller and/or the user's body part associated with the user-interaction controller within the user's field of vision. In particular, a pose of the user-interaction controller and/or the user's body part associated with the user-interaction controller in the simulated environment can be portrayed to closely emulate a pose of the user-interaction controller and/or the user's body part associated with the user-interaction controller in the user's field of vision in the real-world environment. This would provide the user with a feeling of immersion within the simulated environment and would considerably enhance the user's viewing experience.

Throughout the present disclosure, the term "image renderer" refers to equipment that, when operated, renders images of the visual scene.

Optionally, the at least one image renderer is implemented as at least one display. Optionally, the at least one display is selected from the group consisting of: a Liquid Crystal Display (LCD), a Light Emitting Diode (LED)-based display, a micro LED-based display, an Organic LED (OLED)-based display, a micro OLED-based display, a Liquid Crystal on Silicon (LCoS)-based display, a pinhole aperture array-based display, and a Cathode Ray Tube (CRT)-based display.

Optionally, the at least one image renderer is implemented as at least one projector. Optionally, in this regard, the images are projected onto a projection screen or directly onto a retina of the user's eyes. Optionally, the at least one projector is selected from the group consisting of: an LCD-based projector, an LED-based projector, an OLED-based projector, an LCoS-based projector, a Digital Light Processing (DLP)-based projector, and a laser projector.

It will be appreciated that the at least one image renderer can be arranged in various ways within the head-mounted display apparatus. As an example, the at least one image renderer may face the user's eyes. As another example, the at least one image renderer may be arranged in a frame of the head-mounted display apparatus, a projection of the images of the visual scene being reflected from at least one optical element to be directed towards the user's eyes.

Optionally, an absolute pose of the head-mounted display apparatus within the real-world environment is determined using camera-based inside-out tracking. Optionally, in this regard, the head-mounted display apparatus comprises:
  at least one camera configured to capture images of the real-world environment from a perspective of the head-mounted display apparatus, and
  a processing unit coupled to the at least one camera, wherein the processing unit is configured to determine, based on the captured images, the absolute pose of the head-mounted display apparatus within the real-world environment.

Optionally, the at least one camera is arranged on an outer surface of the head-mounted display apparatus, said outer surface being in proximity of the first portion. Optionally, in such a case, the determined absolute pose of the head-mounted display apparatus within the real-world environment would correspond to an absolute pose of the first receiver within the real-world environment. The processor utilises said absolute pose of the first receiver and the relative position and orientation of the first receiver with respect to the at least one emitter, to determine an absolute pose of the at least one emitter within the real-world environment. Furthermore, the processor utilises said absolute pose of the at least one emitter and the relative position and orientation of the second receiver with respect to the at least one emitter, to determine an absolute pose of the second receiver within the real-world environment.

Optionally, the at least one camera is at least one of: a digital camera, a RGB-D camera, a Light Detection and Ranging (LiDAR) camera, a Time-of-Flight (ToF) camera, a laser rangefinder, a stereo camera. Moreover, optionally, the at least one camera is implemented as at least one of: an infrared camera, a visible-light camera, a hyperspectral camera.

In an embodiment, the at least one emitter is arranged on a third portion of the head-mounted display apparatus that is different from the first portion and the second portion. Notably, the at least one emitter is arranged on the third portion in a manner that there is minimal misalignment of the at least one emitter when the head-mounted display apparatus is in use. In an example, the at least one emitter may be arranged on the third portion using an adhesive, an attachment means (for example, such as screws or fasteners), and the like. In another example, the at least one emitter may be snugly fit into a recess within the third portion of the head-mounted display apparatus.

It will be appreciated that the third portion of the head-mounted display apparatus is selected in a manner that arranging the at least one emitter (which is generally larger and heavier in comparison to the first and second receivers) at the third portion would not adversely affect usability of the head-mounted display apparatus.

Optionally, the third portion is a part of a head strap of the head-mounted display apparatus. Optionally, in this regard, the third portion is a central portion of the head strap. When the user wears the head-mounted display apparatus on his/her head, the third portion would lie on a back side of the user's head. The head strap need not have a direct immutable connection to the first portion.

It will be appreciated that arranging the at least one emitter in the head strap of the head-mounted display apparatus allows for maintaining a required weight balance of the head-mounted display apparatus without adversely impacting wearability of the head-mounted display apparatus. Such an arrangement of the at least one emitter optimally utilizes the weight of the at least one emitter to provide an ergonomic design of the head-mounted display apparatus.

Optionally, when the first portion is in the proximity of the image renderer and the at least one emitter is arranged on the head strap, the first receiver arranged on the first portion compensates for possible misalignment of the at least one emitter. Notably, a position and an orientation of the at least one emitter may be different for different users. As an example, the different users may have different head sizes. A distance between the first portion and the third portion would increase with an increase in a radius of the user's head. As another example, the different users may wear the head-mounted display apparatus differently based on at least one of: a hair style of the user, a shape of the user's head, a comfort of the user. An angle between the first portion of the head-mounted display apparatus and the third portion would vary based upon how the user wears the head-mounted display apparatus. In order to compensate for the aforesaid possible misalignment issues, the first receiver is arranged in a known position and orientation with respect to the image renderer, and the relative position and orientation of the first receiver with respect to the at least one emitter is calculated.

Optionally, the at least one emitter comprises a plurality of emitters, and wherein a given receiver, in operation, senses signals emitted by the plurality of emitters. In such a case, the processor is configured to process the generated sensor data to determine relative positions and orientations of the given receiver with respect to each of the plurality of emitters, and to determine, based on said relative positions and orientations, a relative position and orientation of the given receiver with respect to another receiver. It will be appreciated that utilizing the relative positions and orientations of the given receiver with respect to multiple emitters allows for increasing the accuracy of the tracking system. For example, an average value of said relative positions and orientations can be used to determine an accurate value of a relative pose of the given receiver with respect to the plurality of emitters.

In another embodiment, the at least one emitter is arranged on an external device. In such a case, the external device is separate from the head-mounted display apparatus. The external device may or may not be coupled in communication with the head-mounted display apparatus.

Optionally, the external device is a processing device that is configured to perform various image processing operations to generate the images to be rendered via the head-mounted display apparatus. Optionally, in this regard, the external device is communicably coupled to the head-mounted display apparatus wirelessly, or via wires (namely, cables). As an example, the external device may be a virtual reality game console that generates images for a virtual reality shooting game.

Alternatively, optionally, the external device is a base emitter station arranged within a given premises, the base emitter station being shared between a plurality of tracking systems. The base emitter station may or may not be communicably coupled to the head-mounted display apparatus. Moreover, in such a case, a single processor is configured to determine relative positions and orientations of a plurality of receivers of the plurality of tracking systems with respect to the base emitter station. Moreover, in such a case, a single three-dimensional coordinate system is employed for tracking poses of a plurality of head-mounted display apparatuses associated with the plurality of tracking systems. Using the base emitter station as an origin of said three-dimensional coordinate system allows for determining absolute poses of the plurality of head-mounted display apparatuses within the given premises without implementing camera-based inside-out tracking.

Optionally, in this regard, a same frequency spectrum is shared between the plurality of head-mounted display apparatuses for tracking the poses of the plurality of head-mounted display apparatuses using the plurality of tracking systems. In particular, frequency division multiplexing or time division multiplexing is employed to enable said frequency spectrum sharing. A typical tracking system for a given head-mounted display apparatus employs two receivers, wherein each of the two receivers require one communication channel for their operation. As a result, a number of head-mounted display apparatuses that can be used in a single premises becomes very limited. It will be appreciated that by such frequency spectrum sharing, a number of communication channels required per head-mounted display apparatus can be reduced, thereby allowing for a larger number of head-mounted display apparatuses to be used and tracked within the single premises.

In an example, different frequencies may be used to drive different electromagnetic fields for different tracking systems. For example, within a given premises, a 20 kilohertz frequency may be used to drive an electromagnetic field for a first tracking system and a 25 kilohertz frequency may be used to drive an electromagnetic field for second tracking system. Furthermore, time division multiplexing may be employed to utilize a same frequency of electromagnetic signals to drive multiple electromagnetic fields of multiple tracking systems.

It will be appreciated that within the given premises, the base emitter station would be arranged in a manner that the emitted signals propagate through a considerable region of the given premises. Moreover, the signals emitted from the base emitter station propagate though a larger region of the given premises than signals emitted from any single emitter of a single tracking system. As an example, the base emitter station may be arranged at a centre of a given exhibition premises to emit signals within a 10000 cubic meters region of said exhibition premises.

Optionally, the at least one emitter is arranged at a reference location. In such a case, the absolute pose of the at least one emitter within the real-world environment is known. Therefore, the processor utilises said absolute pose of the at least one emitter, and the determined relative positions and orientations of the first receiver and the second receiver with respect to the at least one emitter, to determine the absolute poses of the first receiver and the second receiver within the real-world environment.

As an example, four emitters may be arranged at four reference locations within a given indoor environment in a manner that signals emitted by the four emitters propagate through the entire three-dimensional space of the given indoor environment. In such an example, the four emitters may be directly arranged within the given indoor environment or may be arranged on external devices that are placed within the given indoor environment.

Optionally, the tracking system further comprises a third receiver arranged at a reference location, wherein the processor is configured to determine a relative position and orientation of the third receiver with respect to the at least one emitter, and to determine, based on said relative position and orientation, relative positions and orientations of the first receiver and the second receiver with respect to the third receiver. Optionally, in this regard, the reference location of the third receiver acts as an origin of a three-dimensional coordinate system. It will be appreciated that using the third receiver in the aforesaid manner enables tracking using the tracking system even in situations where certain tracking technologies cannot be implemented (for example, visible-light based tracking is difficult to implement in a dark room).

Optionally, the reference location is a central location of the real-world environment.

Optionally, the head-mounted display apparatus further comprises at least one motion sensor, wherein sensor data of the at least one motion sensor is employed for enhancing an accuracy of the tracking system. Optionally, in this case, the at least one motion sensor is at least one of: an accelerometer, a gyroscope, a magnetometer.

Moreover, optionally, the tracking system employs Kalman filtering or averaging technique to combine the sensor data of the at least one motion sensor and the sensor data generated by the first and second receivers. Such combined sensor data is then processed by the processor to determine the relative positions and orientations of the first receiver and the second receiver with respect to the at least one emitter, and the relative position and orientation of the second receiver with respect to the first receiver. It will be appreciated that combining the sensor data enhances an accuracy, stability and reliability of the tracking system.

The present disclosure also relates to the method as described above. Various embodiments and variants disclosed above, with respect to the aforementioned first aspect, apply mutatis mutandis to the method.

Optionally, in the method, the first portion is in a proximity of an image renderer of the head-mounted display apparatus, a relative position and orientation of the first receiver with respect to the image renderer being known, wherein the method further comprises determining a relative position and orientation of the user-interaction controller with respect to a field of view that is visible to the user via the image renderer, based on the relative position and orientation of the first receiver with respect to the image renderer and the relative position and orientation of the second receiver with respect to the first receiver.

According to an embodiment, in the method, the at least one emitter is arranged on a third portion of the head-mounted display apparatus that is different from the first portion and the second portion.

Optionally, in the method, the third portion is a part of a head strap of the head-mounted display apparatus.

According to another embodiment, in the method, the at least one emitter is arranged on an external device.

Optionally, in the method, the at least one emitter is arranged at a reference location.

Optionally, in the method, the at least one emitter comprises a plurality of emitters, and wherein the step of sensing the emitted signals comprises sensing, via a given receiver, signals emitted by the plurality of emitters.

Optionally, in the method, a third receiver is arranged at a reference location, and the method further comprises
    determining a relative position and orientation of the third receiver with respect to the at least one emitter; and
    determining, based on said relative position and orientation, relative positions and orientations of the first receiver and the second receiver with respect to the third receiver.

Optionally, in the method, the emitted signals are electromagnetic signals.

Alternatively, optionally, in the method, the emitted signals are acoustic signals.

Optionally, in the method, the generated sensor data comprises measurements of at least one signal characteristic of the signals.

Optionally, in the method, the at least one signal characteristic comprises at least one of: a strength, a phase, a wavelength, a frequency, a time-of-flight, an angle of arrival, a polarization, a Doppler spread, a delay spread, a delay signature.

DETAILED DESCRIPTION OF THE DRAWINGS

Figure 1:
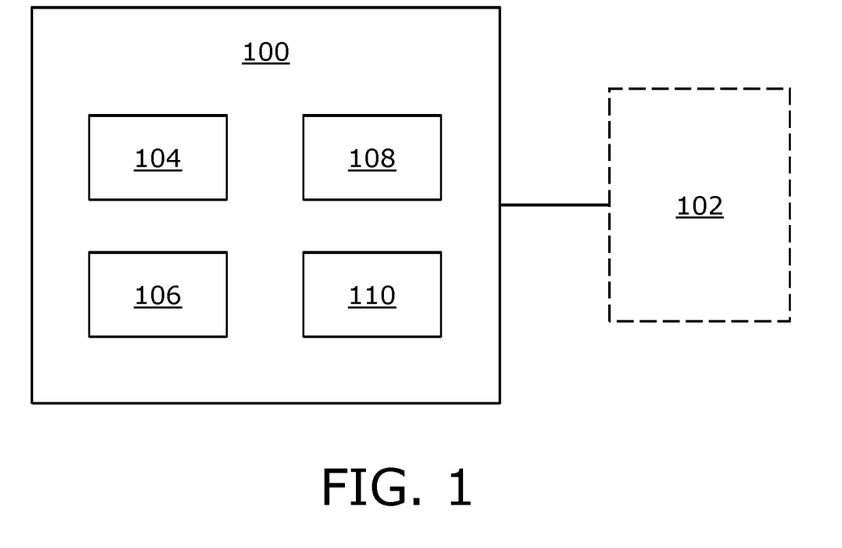
FIGS. 1 and 2 illustrate block diagrams of architectures of a tracking system for use in a head-mounted display apparatus, in accordance with different embodiments of the present disclosure.

Referring to FIG. 1, illustrated is a block diagram of an architecture of a tracking system 100 for use in a head-mounted display apparatus 102, in accordance with an embodiment of the present disclosure. The tracking system 100 comprises at least one emitter (depicted as an emitter 104), a first receiver 106 and a second receiver 108, and a processor 110. The at least one emitter 104, in operation, emits signals. The first receiver 106 and the second receiver 108, in operation, sense the emitted signals and generate sensor data. The processor 110 is configured to process the generated sensor data to determine relative positions and orientations of the first receiver 106 and the second receiver 108 with respect to the at least one emitter 104, and to determine, based on the determined relative positions and orientations, a relative position and orientation of the second receiver 108 with respect to the first receiver 106.

Figure 2:
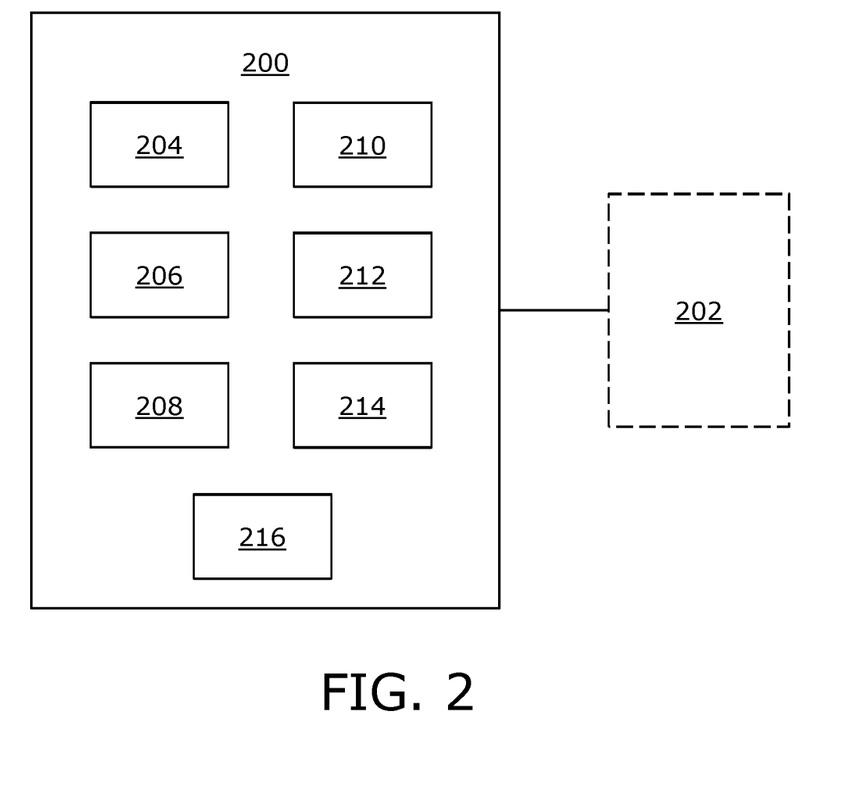

Referring to FIG. 2, illustrated is a block diagram of an architecture of a tracking system 200 for use in a head-mounted display apparatus 202, in accordance with another embodiment of the present disclosure. The tracking system 200 comprises at least one emitter (comprising a plurality of emitters 204, 206 and 208), a first receiver 210, a second receiver 212, a third receiver 214, and a processor 216. A given receiver, in operation, senses signals emitted by the emitters 204, 206 and 208.

The third receiver 214 is arranged at a reference location. The processor 216 is configured to determine a relative position and orientation of the third receiver 214 with respect to the emitters 204, 206 and 208, and to determine, based on said relative position and orientation, relative positions and orientations of the first receiver 210 and the second receiver 212 with respect to the third receiver 214.

It may be understood by a person skilled in the art that FIGS. 1 and 2 depict simplified architectures of the tracking systems 100 and 200 for sake of clarity, which should not unduly limit the scope of the claims herein. The person skilled in the art will recognize many variations, alternatives, and modifications of embodiments of the present disclosure.

Figure 3:
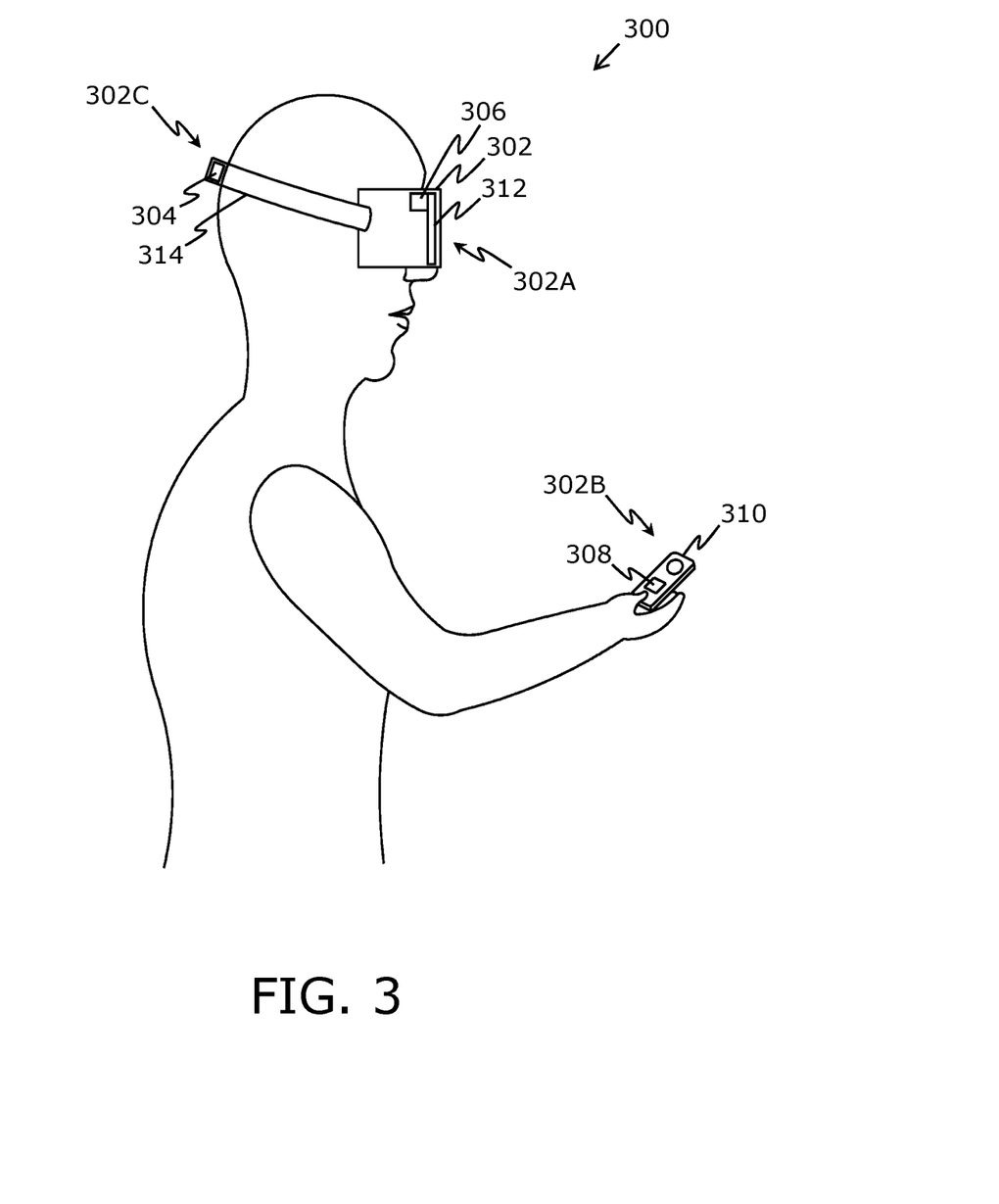
FIGS. 3 and 4 are schematic illustrations of a tracking system in use, in accordance with different embodiments of the present disclosure.

Referring to FIG. 3, illustrated is a schematic illustration of a tracking system 300 in use, in accordance with an embodiment of the present disclosure. As shown, the tracking system 300 is used in a head-mounted display apparatus 302, wherein the head-mounted display apparatus 302 in operation is worn by the user on his/her head.

The tracking system 300 comprises at least one emitter (depicted as an emitter 304), a first receiver 306 and a second receiver 308, and a processor (not shown). The first receiver 306 and the second receiver 308 are arranged on a first portion 302A and a second portion 302B of the head-mounted display apparatus 302, respectively. The first portion 302A faces a user when the head-mounted display apparatus 302 is worn by the user, and the second portion 302B is a part of a user-interaction controller 310 of the head-mounted display apparatus 302.

As shown, the first portion 302A is in a proximity of an image renderer 312 of the head-mounted display apparatus 302. Moreover, the at least one emitter 304 is arranged on a third portion 302C of the head-mounted display apparatus 302 that is different from the first portion 302A and the second portion 302B. The third portion 302C is a part of a head strap 314 of the head-mounted display apparatus 302.

The at least one emitter 304, in operation, emits signals. The first receiver 306 and the second receiver 308, in operation, sense the emitted signals and generate sensor data. The processor is configured to process the generated sensor data to determine relative positions and orientations of the first receiver 306 and the second receiver 308 with respect to the at least one emitter 304, and to determine, based on the determined relative positions and orientations, a relative position and orientation of the second receiver 308 with respect to the first receiver 306.

Figure 4:
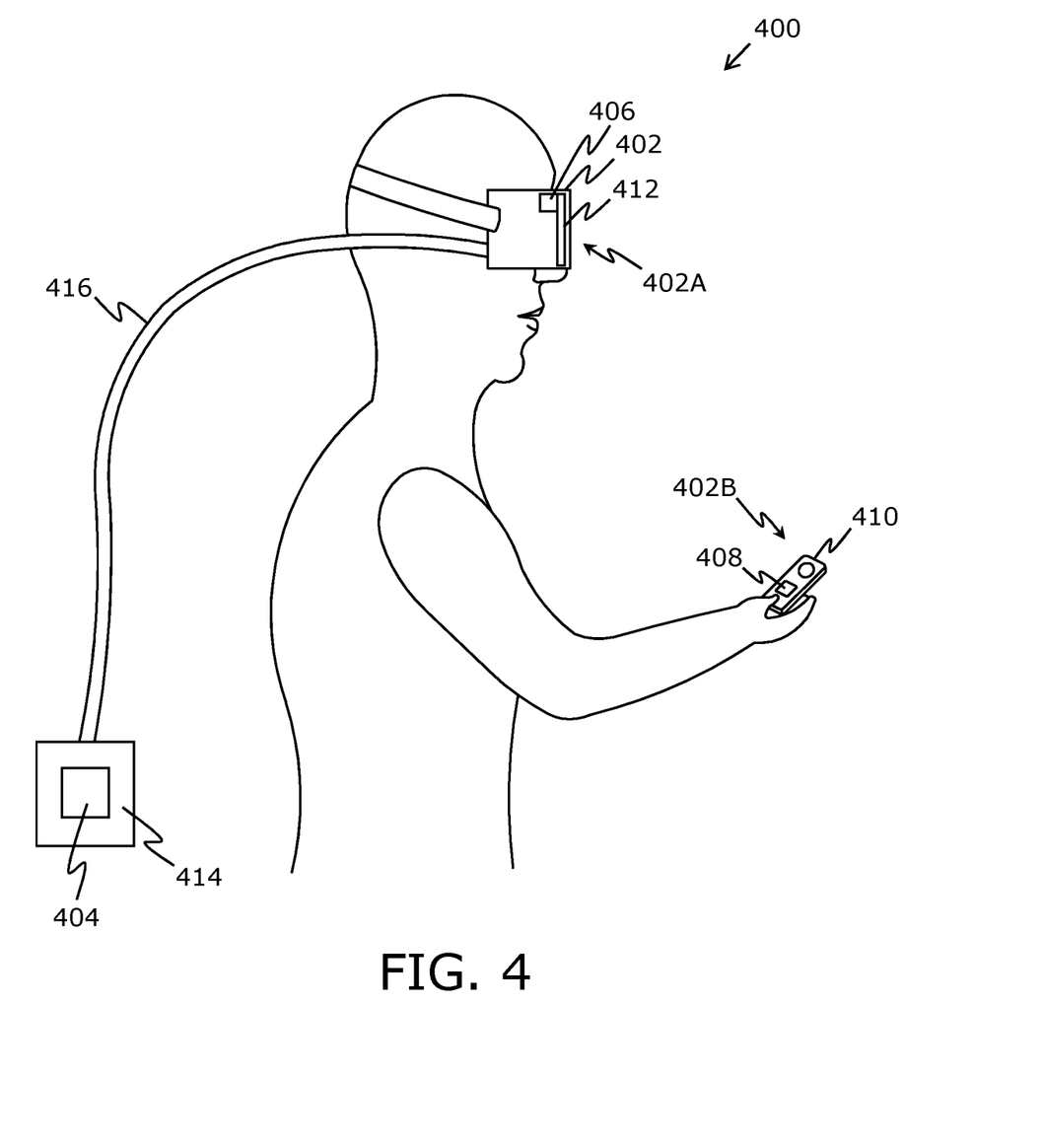

Referring to FIG. 4, illustrated is a schematic illustration of a tracking system 400 in use, in accordance with another embodiment of the present disclosure. As shown, the tracking system 400 is used in a head-mounted display apparatus 402, wherein the head-mounted display apparatus 402 in operation is worn by the user on his/her head.

The tracking system 400 comprises at least one emitter (depicted as an emitter 404), a first receiver 406 and a second receiver 408, and a processor (not shown). The first receiver 406 and the second receiver 408 are arranged on a first portion 402A and a second portion 402B of the head-mounted display apparatus 402, respectively. The first portion 402A faces a user when the head-mounted display apparatus 402 is worn by the user, and the second portion 402B is a part of a user-interaction controller 410 of the head-mounted display apparatus 402.

As shown, the first portion 402A is in a proximity of an image renderer 412 of the head-mounted display apparatus 402. Moreover, the at least one emitter 404 is arranged on an external device 414 that is communicably coupled to the head-mounted display apparatus 402. As shown, the external device 414 is communicably coupled to the head-mounted display apparatus 402 via a cable 416.

The at least one emitter 404, in operation, emits signals. The first receiver 406 and the second receiver 408, in operation, sense the emitted signals and generate sensor data. The processor is configured to process the generated sensor data to determine relative positions and orientations of the first receiver 406 and the second receiver 408 with respect to the at least one emitter 404, and to determine, based on the determined relative positions and orientations, a relative position and orientation of the second receiver 408 with respect to the first receiver 406.

FIGS. 3 and 4 are merely simplified example illustrations of tracking systems 300 and 400, for sake of clarity only, and should not unduly limit the scope of the claims herein. A person skilled in the art will recognize many variations, alternatives, and modifications of embodiments of the present disclosure.

Figure 5:
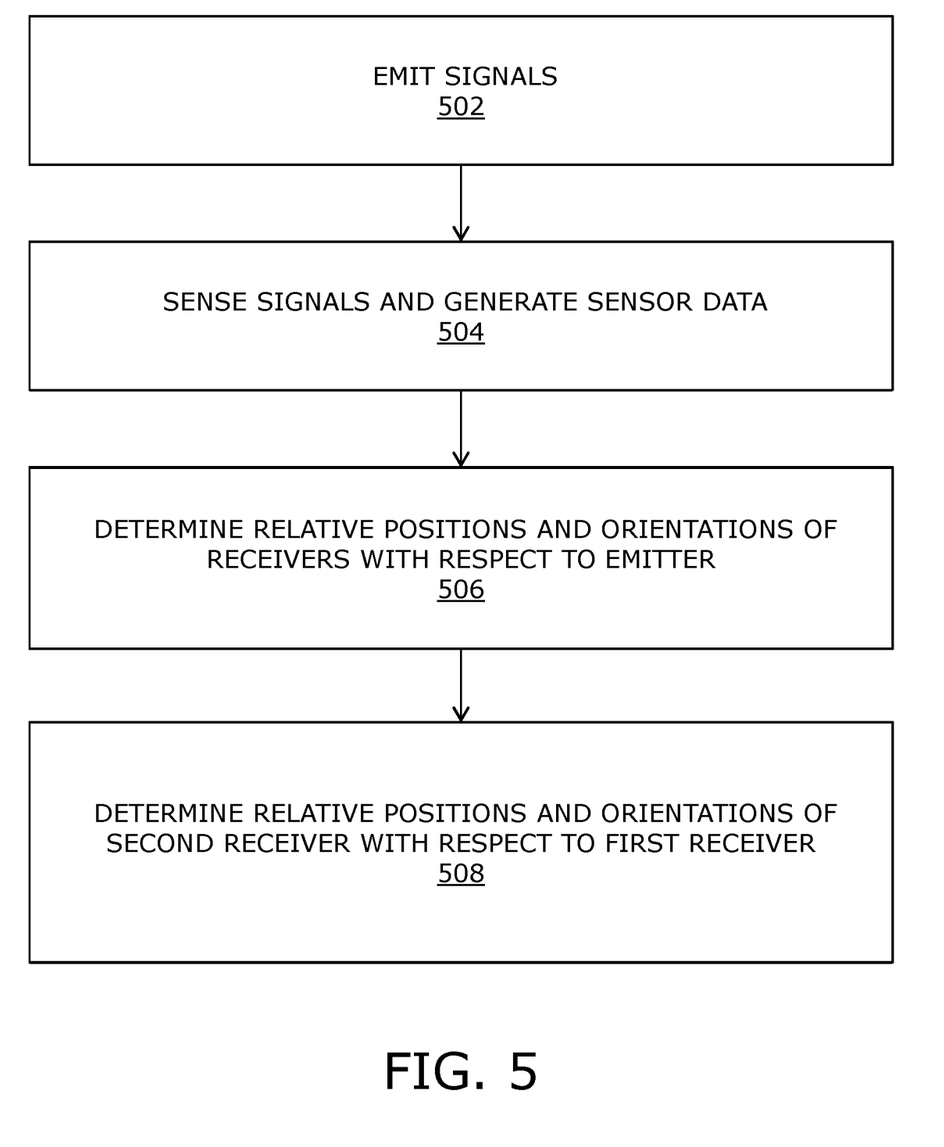
FIG. 5 illustrates steps of a method of tracking, in accordance with an embodiment of the present disclosure.

Referring to FIG. 5, illustrated are steps of a method of tracking, in accordance with an embodiment of the present disclosure. At a step 502, signals are emitted via at least one emitter. At a step 504, the emitted signals are sensed, and sensor data is generated, via a first receiver and a second receiver. The first receiver and the second receiver are arranged on a first portion and a second portion of a head-mounted display apparatus, respectively. The first portion faces a user when the head-mounted display apparatus is worn by the user, and the second portion is a part of a user-interaction controller of the head-mounted display apparatus. At a step 506, the generated sensor data is processed to determine relative positions and orientations of the first receiver and the second receiver with respect to the at least one emitter. At a step 508, a relative position and orientation of the second receiver with respect to the first receiver is determined, based on the determined relative positions and orientations.

The steps 502 to 508 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A tracking system for use in a head-mounted display apparatus, the tracking system comprising:
   at least one emitter that, in operation, emits signals;
   a first receiver and a second receiver that, in operation, sense the emitted signals and generate sensor data, the first receiver and the second receiver being arranged on a first portion and a second portion of the head-mounted display apparatus, respectively, wherein the first portion faces a user when the head-mounted display apparatus is worn by the user, and the second portion is a part of a user-interaction controller of the head-mounted display apparatus; and
   a processor configured to process the generated sensor data to determine relative positions and orientations of the first receiver and the second receiver with respect to the at least one emitter, and to determine, based on the determined relative positions and orientations, a relative position and orientation of the second receiver with respect to the first receiver.

2. The tracking system of claim 1, wherein the first portion is in a proximity of an image renderer of the head-mounted display apparatus, a relative position and orientation of the first receiver with respect to the image renderer being known, wherein the processor is configured to determine a relative position and orientation of the user-interaction controller with respect to a field of view that is visible to the user via the image renderer, based on the relative position and orientation of the first receiver with respect to the image renderer and the relative position and orientation of the second receiver with respect to the first receiver.

3. The tracking system of claim 1, wherein the at least one emitter is arranged on a third portion of the head-mounted display apparatus that is different from the first portion and the second portion.

4. The tracking system of claim 3, wherein the third portion is a part of a head strap of the head-mounted display apparatus.

5. The tracking system of claim 1, wherein the at least one emitter is arranged on an external device.

6. The tracking system of claim 1, wherein the at least one emitter is arranged at a reference location.

7. The tracking system of claim 1, wherein the at least one emitter comprises a plurality of emitters, and wherein a given receiver, in operation, senses signals emitted by the plurality of emitters.

8. The tracking system of claim 1, further comprising a third receiver arranged at a reference location, wherein the processor configured to determine a relative position and orientation of the third receiver with respect to the at least one emitter, and to determine, based on said relative position and orientation, relative positions and orientations of the first receiver and the second receiver with respect to the third receiver.

9. The tracking system of claim 1, wherein the emitted signals are electromagnetic signals.

10. The tracking system of claim 1, wherein the emitted signals are acoustic signals.

11. The tracking system of claim 1, wherein the generated sensor data comprises measurements of at least one signal characteristic of the signals.

12. The tracking system of claim 11, wherein the at least one signal characteristic comprises at least one of: a strength, a phase, a wavelength, a frequency, a time-of-flight, an angle of arrival, a polarization, a Doppler spread, a delay spread, a delay signature.

13. A method of tracking, the method comprising:
emitting signals, via at least one emitter;
sensing, via a first receiver and a second receiver, the emitted signals and generating sensor data, the first receiver and the second receiver being arranged on a first portion and a second portion of a head-mounted display apparatus, respectively, wherein the first portion faces a user when the head-mounted display apparatus is worn by the user, and the second portion is a part of a user-interaction controller of the head-mounted display apparatus;
processing the generated sensor data to determine relative positions and orientations of the first receiver and the second receiver with respect to the at least one emitter; and
determining, based on the determined relative positions and orientations, a relative position and orientation of the second receiver with respect to the first receiver.

14. The method of claim 13, wherein the first portion is in a proximity of an image renderer of the head-mounted display apparatus, a relative position and orientation of the first receiver with respect to the image renderer being known, wherein the method further comprises determining a relative position and orientation of the user-interaction controller with respect to a field of view that is visible to the user via the image renderer, based on the relative position and orientation of the first receiver with respect to the image renderer and the relative position and orientation of the second receiver with respect to the first receiver.

15. The method of claim 13, wherein the at least one emitter is arranged on a third portion of the head-mounted display apparatus that is different from the first portion and the second portion.

16. The method of claim 15, wherein the third portion is a part of a head strap of the head-mounted display apparatus.

17. The method of claim 13, wherein the at least one emitter is arranged on an external device.

18. The method of claim 13, wherein the at least one emitter is arranged at a reference location.

19. The method of claim 13, wherein the at least one emitter comprises a plurality of emitters, and wherein the step of sensing the emitted signals comprises sensing, via a given receiver, signals emitted by the plurality of emitters.

20. The method of claim 13, wherein a third receiver is arranged at a reference location, and wherein the method further comprises
determining a relative position and orientation of the third receiver with respect to the at least one emitter; and
determining, based on said relative position and orientation, relative positions and orientations of the first receiver and the second receiver with respect to the third receiver.

21. The method of claim 13, wherein the emitted signals are electromagnetic signals.

22. The method of claim 13, wherein the emitted signals are acoustic signals.

23. The method of claim 13, wherein the generated sensor data comprises measurements of at least one signal characteristic of the signals.

24. The method of claim 23, wherein the at least one signal characteristic comprises at least one of: a strength, a phase, a wavelength, a frequency, a time-of-flight, an angle of arrival, a polarization, a Doppler spread, a delay spread, a delay signature.

* * * * *